US012340546B2

United States Patent
El-Khatib et al.

(10) Patent No.: US 12,340,546 B2
(45) Date of Patent: Jun. 24, 2025

(54) VEHICULAR OCCUPANT MONITORING SYSTEM USING CENTRALIZED CAMERA WITH EXPANDED VIEW

(71) Applicant: Magna Electronics Inc., Auburn Hills, MI (US)

(72) Inventors: Hassan Mohsen El-Khatib, Windsor (CA); Samiul Adnan Al Mamun, Brooklyn, NY (US); Gopalsamy Padmanaban, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 239 days.

(21) Appl. No.: 18/056,437

(22) Filed: Nov. 17, 2022

(65) Prior Publication Data

US 2023/0162463 A1    May 25, 2023

Related U.S. Application Data

(60) Provisional application No. 63/264,308, filed on Nov. 19, 2021.

(51) Int. Cl.
*G06V 10/147*        (2022.01)
*B60R 1/02*          (2006.01)
(Continued)

(52) U.S. Cl.
CPC ............ *G06V 10/147* (2022.01); *B60R 1/025* (2013.01); *B60R 1/12* (2013.01); *B60R 1/22* (2022.01);
(Continued)

(58) Field of Classification Search
CPC ...... G06V 10/147; G06V 20/56; G06V 20/59; G06V 40/161; B60R 1/025; B60R 1/12; B60R 1/22; B60R 1/29; B60R 2001/1253; B60R 2300/105; B60R 2300/20; B60R 2300/607; B60R 2300/605; B60R 2300/8006; B60R 1/28; B60W 30/12; B60W 2420/403; H04N 23/695; H04N 23/90; H04N 7/183; H04N 23/698; H04N 23/57
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

*Primary Examiner* — Nasim N Nirjhar
(74) *Attorney, Agent, or Firm* — HONIGMAN LLP (57) ABSTRACT

A vehicular vision system includes a camera disposed within a cabin of a vehicle equipped with the vehicular vision system and positionable to view within an interior cabin of the vehicle and positionable to view exterior of the vehicle through at least one window of the vehicle. The system includes an actuator disposed at the vehicle and electrically operable to rotate the camera about an axis relative to the vehicle. Multiple frames of image data captured by the camera as the camera rotates about the axis are processed at an ECU for a plurality of vehicle functions. Respective frames of image data of the multiple frames of captured image data are processed for respective vehicle functions of the plurality of vehicle functions based on respective viewing directions of the camera when the respective frames of image data are captured by the camera.

24 Claims, 3 Drawing Sheets (51) Int. Cl.
  *B60R 1/12*    (2006.01)
  *B60R 1/22*    (2022.01)
  *B60R 1/29*    (2022.01)
  *B60W 30/12*   (2020.01)
  *G06V 20/56*   (2022.01)
  *G06V 20/59*   (2022.01)
  *G06V 40/16*   (2022.01)
  *H04N 23/695*  (2023.01)
  *H04N 23/90*   (2023.01)

(52) U.S. Cl.
  CPC .............. *B60R 1/29* (2022.01); *B60W 30/12* (2013.01); *G06V 20/56* (2022.01); *G06V 20/59* (2022.01); *G06V 40/161* (2022.01); *H04N 23/695* (2023.01); *H04N 23/90* (2023.01); *B60R 2001/1253* (2013.01); *B60R 2300/105* (2013.01); *B60R 2300/20* (2013.01); *B60R 2300/607* (2013.01); *B60W 2420/403* (2013.01)

(56) References Cited

U.S. PATENT DOCUMENTS

| | | | |
|---|---|---|---|
| 5,734,357 A | 3/1998 | Matsumoto | |
| 5,949,331 A | 9/1999 | Schofield et al. | |
| 6,400,835 B1 | 6/2002 | Lemelson et al. | |
| 7,034,807 B2 | 4/2006 | Maggioni | |
| 7,038,577 B2 | 5/2006 | Pawlicki et al. | |
| 7,199,767 B2 | 4/2007 | Spero | |
| 7,330,124 B2 | 2/2008 | Ota | |
| 7,720,580 B2 | 5/2010 | Higgins-Luthman | |
| 7,855,755 B2 | 12/2010 | Weller et al. | |
| 7,914,187 B2 | 3/2011 | Higgins-Luthman et al. | |
| 8,218,832 B2 | 7/2012 | Inada | |
| 8,926,105 B2 | 1/2015 | Verheyden | |
| 9,090,234 B2 * | 7/2015 | Johnson | B60T 7/22 |
| 9,140,789 B2 * | 9/2015 | Lynam | G01S 17/86 |
| 9,405,120 B2 | 8/2016 | Graf et al. | |
| 9,465,488 B2 | 10/2016 | Howard | |
| 10,017,114 B2 | 7/2018 | Bongwald | |
| 10,046,706 B2 | 8/2018 | Larson et al. | |
| 10,065,574 B2 | 9/2018 | Tiryaki | |
| 10,071,687 B2 | 9/2018 | Ihlenburg et al. | |
| 10,099,614 B2 | 10/2018 | Diessner | |
| 10,277,837 B2 | 4/2019 | Madau et al. | |
| 10,442,360 B2 | 10/2019 | LaCross et al. | |
| 11,176,356 B2 | 11/2021 | Kase | |
| 11,308,721 B2 | 4/2022 | Boron et al. | |
| 11,582,425 B2 | 2/2023 | Liu | |
| 11,639,134 B1 | 5/2023 | Huizen et al. | |
| 11,780,372 B2 | 10/2023 | Sobecki et al. | |
| 11,827,153 B2 | 11/2023 | Miller et al. | |
| 11,856,330 B2 | 12/2023 | Liu | |
| 11,930,264 B2 | 3/2024 | Conger et al. | |
| 11,972,597 B2 | 4/2024 | Rother et al. | |
| 2003/0169213 A1 | 9/2003 | Spero | |
| 2006/0181621 A1 | 8/2006 | Wang et al. | |
| 2006/0202843 A1 | 9/2006 | Ota | |
| 2008/0158357 A1 | 7/2008 | Connell et al. | |
| 2009/0160936 A1 * | 6/2009 | McCormack | H04N 23/698 348/143 |
| 2010/0259629 A1 | 10/2010 | Lo | |
| 2011/0122520 A1 | 5/2011 | Verheyden | |
| 2014/0285666 A1 | 9/2014 | O'Connell et al. | |
| 2014/0333745 A1 | 11/2014 | Howard | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0062089 A1 | 3/2015 | Howard | |
| 2015/0092042 A1 | 4/2015 | Fursich | |
| 2015/0124068 A1 | 5/2015 | Madau et al. | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0065482 A1 * | 3/2018 | Yagyu | G06V 10/147 |
| 2018/0134217 A1 | 5/2018 | Peterson et al. | |
| 2018/0222414 A1 | 8/2018 | Ihlenburg et al. | |
| 2019/0118717 A1 | 4/2019 | Blank et al. | |
| 2020/0039447 A1 * | 2/2020 | Winden | H04N 23/55 |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0155167 A1 | 5/2021 | Lynam et al. | |
| 2021/0162926 A1 | 6/2021 | Lu | |
| 2021/0245662 A1 | 8/2021 | Blank et al. | |
| 2021/0291739 A1 | 9/2021 | Kasarla et al. | |
| 2021/0323473 A1 | 10/2021 | Peterson et al. | |
| 2022/0111857 A1 | 4/2022 | Kulkarni | |
| 2022/0242438 A1 | 8/2022 | Sobecki et al. | |
| 2022/0254132 A1 | 8/2022 | Rother | |
| 2022/0402435 A1 * | 12/2022 | Saville | G06F 3/0488 |

* cited by examiner

VEHICULAR OCCUPANT MONITORING SYSTEM USING CENTRALIZED CAMERA WITH EXPANDED VIEW

CROSS REFERENCE TO RELATED APPLICATION

The present application claims the filing benefits of U.S. provisional application Ser. No. 63/264,308, filed Nov. 19, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a camera disposed within a cabin of a vehicle equipped with the vehicular vision system and positionable to view within an interior cabin of the vehicle and positionable to view exterior of the vehicle through at least one window of the vehicle. The camera may include a CMOS imaging array with at least one million photosensors arranged in rows and columns. The system includes an actuator disposed at the vehicle and electrically operable to rotate the camera about an axis relative to the vehicle. The camera captures frames of image data as the camera is rotated about the axis by the actuator. The system includes an electronic control unit (ECU) with electronic circuitry and associated software. The electronic circuitry of the ECU includes an image processor for processing frames of image data captured by the camera. Multiple frames of image data captured by the camera as the camera rotates about the axis are processed at the ECU for a plurality of vehicle functions. Respective frames of image data of the multiple frames of captured image data are processed at the ECU for respective vehicle functions of the plurality of vehicle functions based on respective viewing directions of the camera when the respective frames of image data are captured by the camera.

These and other objects, advantages, purposes and features of the present invention will become apparent upon review of the following specification in conjunction with the drawings.

DESCRIPTION OF THE PREFERRED EMBODIMENTS

A vehicle vision system and/or occupant monitoring system operates to capture images interior and exterior of the vehicle and may process the captured image data to display images and to detect objects within or at or near the vehicle and in the predicted path of the vehicle, such as to monitor occupant status and/or to assist a driver of the vehicle in maneuvering the vehicle. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
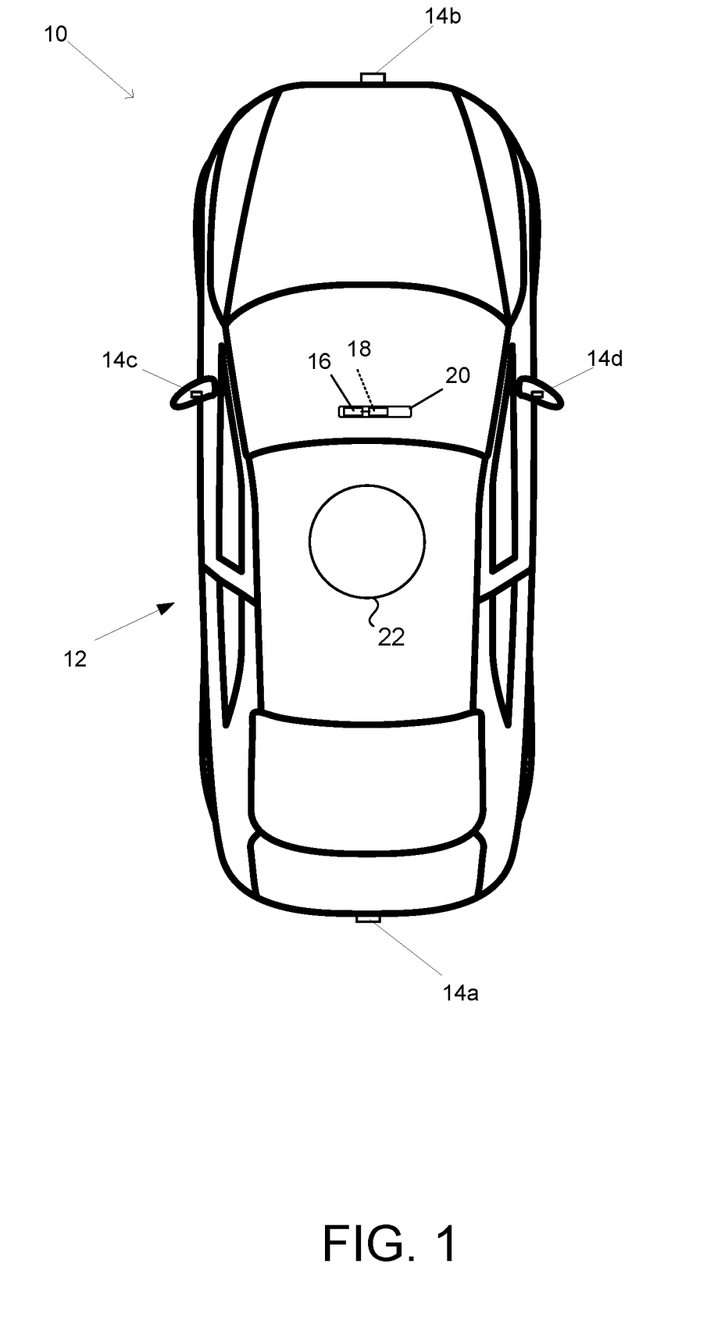
FIG. 1 is a plan view of a vehicle with a vision system that incorporates at least one perception unit.

Referring now to the drawings and the illustrative embodiments depicted therein, a vehicle 10 includes an imaging system or vision system 12 that includes a perception sensor or unit 22 that includes, for example, one or more cameras or other imaging sensors. Optionally, the system includes at least one exterior viewing imaging sensor or camera, such as a rearward viewing imaging sensor or camera 14a (and the system may optionally further include multiple exterior viewing imaging sensors or cameras, such as a forward viewing camera 14b at the front (or at the windshield) of the vehicle, and a sideward/rearward viewing camera 14c, 14d at respective sides of the vehicle). The perception sensor 22 captures images interior and exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
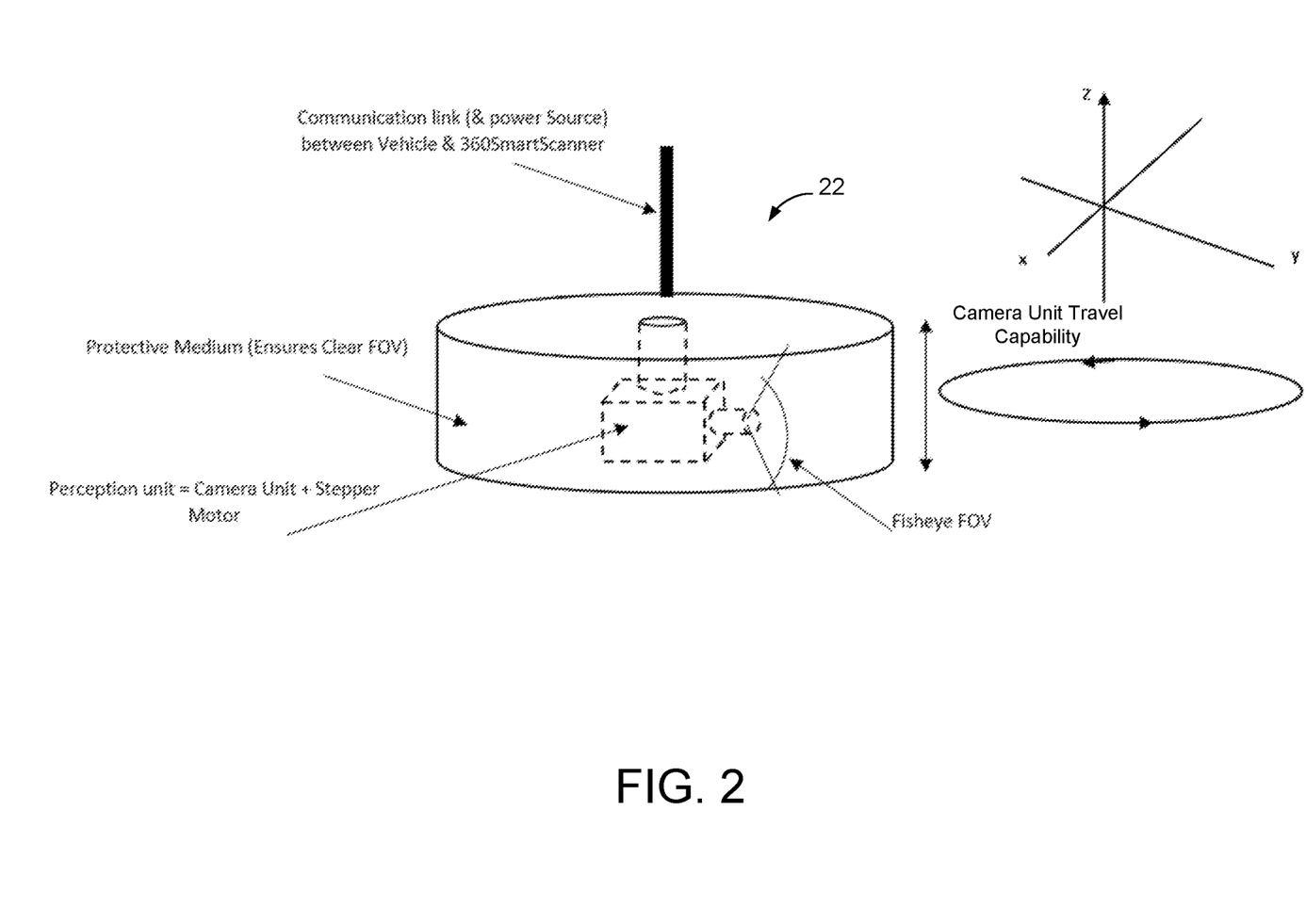
FIG. 2 is a schematic view of the perception unit disposed within the vehicle of FIG. 1.

Referring now to FIG. 2, implementations herein are directed toward a vehicular vision system or occupant monitoring system that supports high-level autonomy in automotive applications. The system comprises a 360 degree road scanner that includes the perceptions unit/sensor 22 (e.g., a single camera with a 360 degree field of view or dual cameras with 180 degree fields of view, three cameras with 120 degree fields of view, etc.). The perception unit may be constantly in motion (i.e., rotational motion in the x-y plane or about a vertical axis (i.e., perpendicular to the ground) for a number of complete rotations per second) using an actuator having a motor (e.g., an integrated stepper motor). The actuator and stepper motor may continuously track the position or viewing direction of the perception unit. In this way, the system may determine the current field of sensing of the image sensors and thus accurately determine where, relative to the vehicle/the perception unit, objects detected in image data captured by the image sensors are located. For example, the system, when detecting an object (e.g., a pedestrian) present in the field of view of the image sensor, determines the direction of the image sensor's principal viewing axis at the point the object was captured, and based on the direction of the image sensor, determines a relative location of the object (e.g., in front of the vehicle, to the side of the vehicle, etc.). The actuator may be mechanically linked or connected with the perception unit or camera to rotate the camera (or cameras) or other image sensors (e.g., radar sensors, lidar, etc.) about the vertical axis. The mechanical linkage may ensure that the exact direction that the camera is viewing may always be accurately determined. Other means of determining the current field of view (or viewing direction) of the image sensors may be used. For example, fiducial markers may be disposed within the cabin of the vehicle. Based on the position of the fiducial markers within frames of captured image data, the system may determine the viewing direction of the image sensor.

The system or the camera(s)/sensor(s) of the perception unit 22 may include image processing software for object detection to detect, for example, vehicles, traffic lanes, vulnerable road users (e.g., cyclists, pedestrians), traffic signs, etc. The camera(s) may include wide-angle fisheye lenses with a field of view that at least partially includes exterior of the vehicle. For example, the perception unit may be mounted within the cabin of the vehicle, allowing view of both the occupants of the vehicle and exterior of the vehicle (e.g., by viewing through the windows/windshield of the vehicle). The perception unit/cameras may be in continuous communication with a vehicle network of the vehicle (e.g., a controller area network (CAN) and/or Ethernet network). A linkage mechanism may link the stepper motor/perception unit and a mounting bracket to allow translational motion in the z axis relative to the vehicle (i.e., up and down relative to the ground).

The perception unit may be protected by a clear or light transmitting (e.g., visible light transmitting) enclosure (e.g., plastic or glass) to provide protection and secure the perception unit without impeding the field of view of the camera(s) or other image sensors. Optionally, the image sensors capture non-visible light (e.g., infrared light) and the enclosure allows for passage of the non-visible light (and may or may not allow passage of visible light). Optionally, one or more reflective mirrors may be disposed within the cabin of the vehicle to enable the perception unit to view (via image data captured by the camera(s)) and analyze images reflected off the mirror(s) to increase the field of view of the perception unit. For example, a mirror may be placed such that light that reflects off a face of an occupant reflects off the mirror and is directed toward the perception unit, allowing the perception unit a clear view of the occupant's face. The perception unit may use such images to determine information regarding the occupants of the vehicle. For example, the system may determine a status of the driver such as an amount of attentiveness (e.g., drowsy, not keeping eyes on road, not keeping hands on wheel, texting, etc.). The system may determine presence/status of other occupants (e.g., children, pets, etc.).

Figure 3A:
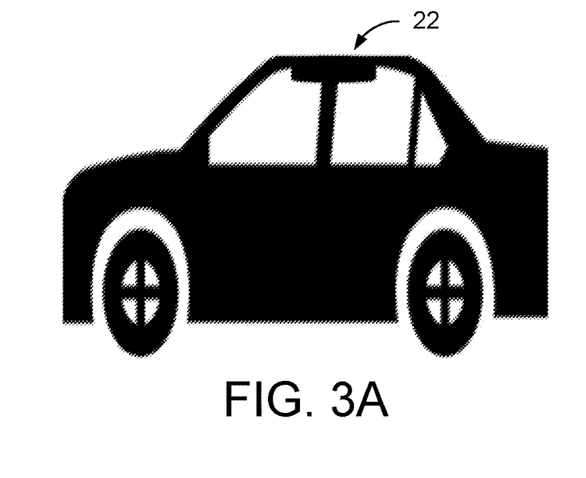
FIGS. 3A and 3B are schematic views of exemplary locations of the perception unit of FIG. 2 within the vehicle of FIG. 1.
Figure 3B:
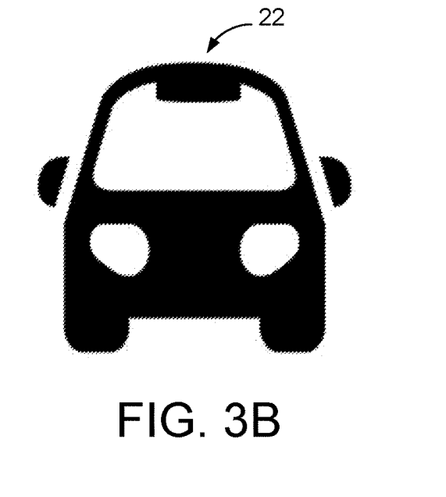

Referring now to FIGS. 3A and 3B, the perception unit may be centrally located/mounted at or within the vehicle. For example, the perception unit may be mounted at an interior roof (e.g., the headliner) of the vehicle. The perception unit may be centrally located within the cabin, such as at a central region of the headliner within the cabin of the vehicle, allowing the perception unit a view of the entire cabin of the vehicle and exterior of the vehicle (e.g., via the windows/windshield) as the perception unit/image sensors rotate.

Similar to conventional Advanced Driver Assist Systems (ADAS) and/or Autonomous Vehicles (AV) perceptions sensors, the vehicular monitoring system described herein captures the images within a designed field of view outside of the vehicle. In addition to these capabilities, the vehicular monitoring system continuously scans the interior and exterior of the vehicle with a 360 degree field of view (e.g., using a stepper motor to rotate one or more image sensors about a vertical axis perpendicular to the ground). The image sensors may rotate at a fixed or predetermined speed (e.g., at least 60 revolutions per minute, at least 120 revolutions per minute, etc.). Optionally, the image sensors rotate at a variable speed such that more important areas are within the field of view of the image sensor(s) for longer than less important areas. For example, the speed of rotation of the image sensors may be increased when the system determines that the current field of view of the image sensors is less likely to include regions or objects of interest and slows down when the system determines that the current field of view of the image sensors is more likely to include regions or objects of interest. Alternatively, the image sensors may rotate to direct the field of view of the image sensors in a manner most appropriate for the current driving scenario. For example, when the vehicle is reversing, the image sensor may rotate to obtain a field of view directed rearward of the vehicle. As another example, when the system determines an imminent lane change (e.g., via actuation of a turn signal or based on detected position within a traffic lane), the image sensor may rotate to view the adjacent traffic lane that the equipped vehicle is approaching.

Additionally, the system may process image data or images that include reflections reflected by one or more mirrors disposed around the cabin of the vehicle to further increase the field of view of the perception unit (e.g., by capturing images of a face of a driver or other occupants of the vehicle). Vehicle information such as wiper blades status, vehicle speed, steering wheel angle, etc., may be shared with the perception unit (e.g., from other systems of the vehicle). The monitoring system may share information relating to detected objects and image analysis with a vehicle control module. The vehicle control module may provide warnings/notifications with the driver or other occupants of the vehicle based on the provided information. The warnings may be visual (e.g., displayed on a display disposed within the vehicle), audible, haptic, etc. The notifications may include information relating to diagnostics services, lateral dynamic changes (i.e., steering), and/or longitudinal dynamic changes (i.e., braking or acceleration).

The perception camera may include a microprocessor or other processing means (which may be located at the camera or elsewhere in the vehicle, such as at a vehicle ECU or an ADAS ECU), an imager, and an image processing chip. The camera may be integrated with the actuator or stepper motor via a linkage shaft and gears to provide rotational and/or translational motion. The perception unit may include a clear or light transmitting housing material to form an enclosure to protect the perception unit (e.g., the moving parts). The enclosure may provide heating when needed to prevent condensation (e.g., when a temperature of the perception unit is below a condensation temperature). The perception unit may be powered by the vehicle (e.g., the engine or car battery) though a connector that connects to a vehicle wire harness. The same connector may also be used to secure communication between the perception unit and the vehicle network. The reflective elements (i.e., mirrors) may be passive elements designed based on vehicle application to improve the perception unit's field of view. That is, the location of the mirrors may have vehicle-specific locations and orientations. The mirrors may be adjustable (e.g., using a ball-and-socket joint).

The system may replace one or more traditional static/fixed cameras (e.g., interior cabin cameras such as an interior rearview mirror and/or exterior cameras such as forward viewing, rear viewing, or side viewing surround view cameras). For example, the system may replace 4-6 cameras typically used to capture image data around the vehicle and provide high level autonomy features. This reduces costs from materials (e.g., cameras, wiring, connectors, etc.) and design. The system may replace a need for one or more driver/occupant monitoring cameras. The system may replace design measures for hosting the camera unit outside the vehicle with simpler measures for disposing the perception unit within the cabin of the vehicle. Thus, the system may reduce installation, manufacturing, and after sale service costs.

Thus, the system provides a centrally disposed camera (or cameras) or other image sensors that are movable or rotatable or pivotable about a generally vertical axis in the vehicle. The camera (or cameras) capture image data as the camera is rotated or moved, and the processor is synchronized with the camera/motor so that the processor knows the position or viewing direction of the camera for each frame of image data captured by the camera. The processor processes captured image data for different vehicular systems or functions.

For example, frames of image data captured by the camera when the camera is viewing forward (such as through the windshield of the vehicle) may be processed for various driving assist functions (e.g., lane departure warning, lane keep assist, automatic headlamp control, pedestrian detection, collision avoidance, automatic emergency braking, and/or the like), and frames of image data captured by the camera when the camera is viewing rearward (such as through the rear window of the vehicle) may be processed for other systems or functions (e.g., electrochromic mirror dimming, collision avoidance, backup assist, rearview display, and/or the like). Frames of image data captured by the camera (or cameras) are thus processed for different functions based on the viewing direction of the camera when the respective frames of image data are captured.

The interior mirror (or mirrors) disposed in the cabin of the vehicle may be set so that, when the camera is viewing in a particular direction, the mirror reflects an image of the driver's head (or of an occupant), whereby frames of image data captured by the camera when viewing in that direction may be processed for a driver monitoring system (or for an occupant monitoring system or occupant detection system or baby monitoring system with use of mirrors at different locations to allow the camera to view other seating regions of the vehicle). Optionally, the system may include a near-infrared light emitting light source to illuminate the cabin of the vehicle with near-infrared light to enhance driver monitoring or occupant monitoring in low lighting conditions. The light source may comprise a light emitting diode (LED) that is energized only when the camera has its viewing direction toward one of the interior mirrors and is thus viewing the driver region or occupant region in the vehicle.

Thus, the system provides a single camera or perception unit that captures multiple frames of image data at different viewing directions, and the system processes frames of image data captured by the camera for different functions or features or systems depending on the viewing direction of the camera when the respective frames of image data are captured.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519;

7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

The system may utilize sensors, such as imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

When capturing and processing image data of the interior cabin, such as for a driver monitoring system and/or head and face direction and position tracking system and/or eye tracking system and/or gesture recognition system, the system may utilize aspects of the systems described in U.S. Pat. Nos. 10,065,574; 10,017,114; 9,405,120 and/or 7,914,187, and/or U.S. Publication Nos. US-2022-0254132; US-2022-0242438; US-2022-0111857; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/663,462, filed May 16, 2022, and/or International PCT Application No. PCT/US2022/075887, filed Sep. 2, 2022, and/or International Publication Nos. WO 2022/241423 and/or WO 2022/187805, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed within a cabin of a vehicle equipped with the vehicular vision system and positionable to view within an interior cabin of the vehicle and positionable to view exterior of the vehicle through at least one window of the vehicle;

wherein the camera comprises a CMOS imaging array, and wherein the CMOS imaging array comprises at least one million photosensors arranged in rows and columns;

an actuator disposed at the vehicle and electrically operable to rotate the camera about an axis relative to the vehicle;

wherein the camera captures frames of image data as the camera is rotated about the axis by the actuator;

an electronic control unit (ECU) comprising electronic circuitry and associated software;

wherein the electronic circuitry of the ECU comprises an image processor for processing frames of image data captured by the camera;

wherein multiple frames of image data captured by the camera as the camera rotates about the axis are processed at the ECU for a plurality of vehicle functions;

wherein respective frames of image data of the multiple frames of captured image data are processed at the ECU for respective vehicle functions of the plurality of vehicle functions based on respective viewing directions of the camera when the respective frames of image data are captured by the camera;

a mirror disposed within the interior cabin of the vehicle, wherein light reflected off an interior object within the interior cabin of the vehicle reflects off the mirror toward the camera;

wherein the camera captures at least one frame of image data representative of the interior object;

wherein, responsive to processing by the image processor of the at least one frame of image data captured by the camera, the vehicular vision system detects the interior object; and wherein the vehicular vision system, responsive to detecting the interior object, generates an output to an occupant monitoring system.

2. The vehicular vision system of claim 1, wherein the camera, when rotated by the actuator about the axis, has a 360 degree field of view.

3. The vehicular vision system of claim 1, further comprising a second camera disposed within the cabin of the vehicle and viewing within the interior cabin of the vehicle and viewing exterior of the vehicle through the at least one window of the vehicle, wherein the second camera captures frames of image data as the second camera is rotated about the axis by the actuator.

4. The vehicular vision system of claim 3, wherein the second camera has a principal viewing axis that is offset 180 degrees from a principal viewing axis of the camera.

5. The vehicular vision system of claim 1, comprising a light transmitting housing, wherein the camera is disposed within the light transmitting housing and views through the light transmitting housing to view within the interior cabin of the vehicle and exterior of the vehicle.

6. The vehicular vision system of claim 1, wherein the actuator comprises a stepper motor.

7. The vehicular vision system of claim 1, wherein the camera continuously rotates about the axis during operation of the vehicular vision system.

8. The vehicular vision system of claim 7, wherein the actuator tracks a viewing direction of the camera as the camera rotates continuously about the axis.

9. The vehicular vision system of claim 1, wherein, responsive to processing by the image processor of frames of image data captured by the camera, the vehicular vision system detects an object within a field of view of the camera and exterior of the vehicle, and wherein the vehicular vision system, responsive to detecting the exterior object, generates an output to a driving assistance system of the vehicle.

10. The vehicular vision system of claim 1, wherein the detected interior object comprises a face of an occupant.

11. The vehicular vision system of claim 1, wherein the camera and the actuator are mounted at a headliner of the vehicle.

12. The vehicular vision system of claim 1, wherein, responsive to a driving condition, the camera rotates about the axis toward a predetermined position based on the driving condition and stops rotation at the predetermined position.

13. The vehicular vision system of claim 1, wherein, responsive to the vehicle undertaking a reversing maneuver, the camera rotates about the axis and stops at a position where the camera views rearward and exterior of the vehicle.

14. The vehicular vision system of claim 1, wherein respective frames of image data are captured with the camera viewing at least a portion of the interior cabin of the vehicle for an occupant monitoring system vehicle function, and wherein respective frames of image data are captured with the camera viewing exterior of the vehicle through the at least one window of the vehicle for a driving assistance system vehicle function.

15. The vehicular vision system of claim 14, wherein the driving assistance system vehicle function comprises a lane keeping function.

16. The vehicular vision system of claim 1, wherein the axis comprises a vertical axis.

17. A vehicular vision system, the vehicular vision system comprising:

a camera disposed within a cabin of a vehicle equipped with the vehicular vision system and positionable to view within an interior cabin of the vehicle and positionable to view exterior of the vehicle through at least one window of the vehicle;

wherein the camera comprises a CMOS imaging array, and wherein the CMOS imaging array comprises at least one million photosensors arranged in rows and columns;

an actuator disposed at the vehicle and electrically operable to rotate the camera about an axis relative to the vehicle;

wherein the camera captures frames of image data as the camera is rotated about the axis by the actuator, and wherein the camera continuously rotates about the axis during operation of the vehicular vision system;

a light transmitting housing, wherein the camera is disposed within the light transmitting housing and views through the light transmitting housing to view within the interior cabin of the vehicle and exterior of the vehicle;

an electronic control unit (ECU) comprising electronic circuitry and associated software;

wherein the electronic circuitry of the ECU comprises an image processor for processing frames of image data captured by the camera;

wherein multiple frames of image data captured by the camera as the camera rotates about the axis are processed at the ECU for a plurality of vehicle functions;

wherein respective frames of image data of the multiple frames of captured image data are processed at the ECU for respective vehicle functions of the plurality of vehicle functions based on respective viewing directions of the camera when the respective frames of image data are captured by the camera;

a mirror disposed within the interior cabin of the vehicle, wherein light reflected off an interior object within the interior cabin of the vehicle reflects off the mirror toward the camera;

wherein the camera captures at least one frame of image data representative of the interior object;

wherein, responsive to processing by the image processor of the at least one frame of image data captured by the camera, the vehicular vision system detects the interior object; and wherein the vehicular vision system, responsive to detecting the interior object, generates an output to an occupant monitoring system.

18. The vehicular vision system of claim 17, wherein the camera, when rotated by the actuator about the axis, has a 360 degree field of view.

19. The vehicular vision system of claim 17, wherein the actuator comprises a stepper motor.

20. The vehicular vision system of claim 17, wherein the actuator tracks a viewing direction of the camera as the camera rotates continuously about the axis.

21. A vehicular vision system, the vehicular vision system comprising:
- a camera disposed within a cabin of a vehicle equipped with the vehicular vision system and positionable to view within an interior cabin of the vehicle and positionable to view exterior of the vehicle through at least one window of the vehicle;
- wherein the camera comprises a CMOS imaging array, and wherein the CMOS imaging array comprises at least one million photosensors arranged in rows and columns;
- an actuator disposed at the vehicle and electrically operable to rotate the camera about an axis relative to the vehicle;
- wherein the camera captures frames of image data as the camera is rotated about the axis by the actuator;
- an electronic control unit (ECU) comprising electronic circuitry and associated software;
- wherein the electronic circuitry of the ECU comprises an image processor for processing frames of image data captured by the camera;
- wherein multiple frames of image data captured by the camera as the camera rotates about the axis are processed at the ECU for a plurality of vehicle functions, and wherein the plurality of vehicle functions comprise (i) an occupant monitoring system function and (ii) a driving assistance system function;
- wherein respective frames of image data of the multiple frames of captured image data are processed at the ECU for the occupant monitoring system function when the camera views at least an occupant region of the interior cabin of the vehicle, and wherein respective frames of image data of the multiple frames of captured image data are processed at the ECU for the driving assistance system function when the camera views exterior of the vehicle through the at least one window of the vehicle;
- wherein, responsive to a driving condition, the camera rotates about the axis toward a predetermined position based on the driving condition and stops rotation at the predetermined position;
- a mirror disposed within the interior cabin of the vehicle, wherein light reflected off an interior object reflects off the mirror toward the camera; and
- wherein the camera captures image data representative of the interior object when the camera captures frames of image data for processing at the ECU for the occupant monitoring system function.

22. The vehicular vision system of claim 21, further comprising a second camera disposed within the cabin of the vehicle and viewing within the interior cabin of the vehicle and viewing exterior of the vehicle through the at least one window of the vehicle, wherein the second camera captures frames of image data as the second camera is rotated about the axis by the actuator.

23. The vehicular vision system of claim 22, wherein the second camera has a principal viewing axis that is offset 180 degrees from a principal viewing axis of the camera.

24. The vehicular vision system of claim 21, wherein the interior object comprises a face of an occupant.

* * * * *